Oct. 29, 1968 W. C. HOPKINS ET AL 3,407,481
METHOD OF PRESSING BACK ELECTRICAL COIL END
TURN PORTIONS IN AN INDUCTIVE DEVICE
Filed July 28, 1966 2 Sheets-Sheet 1
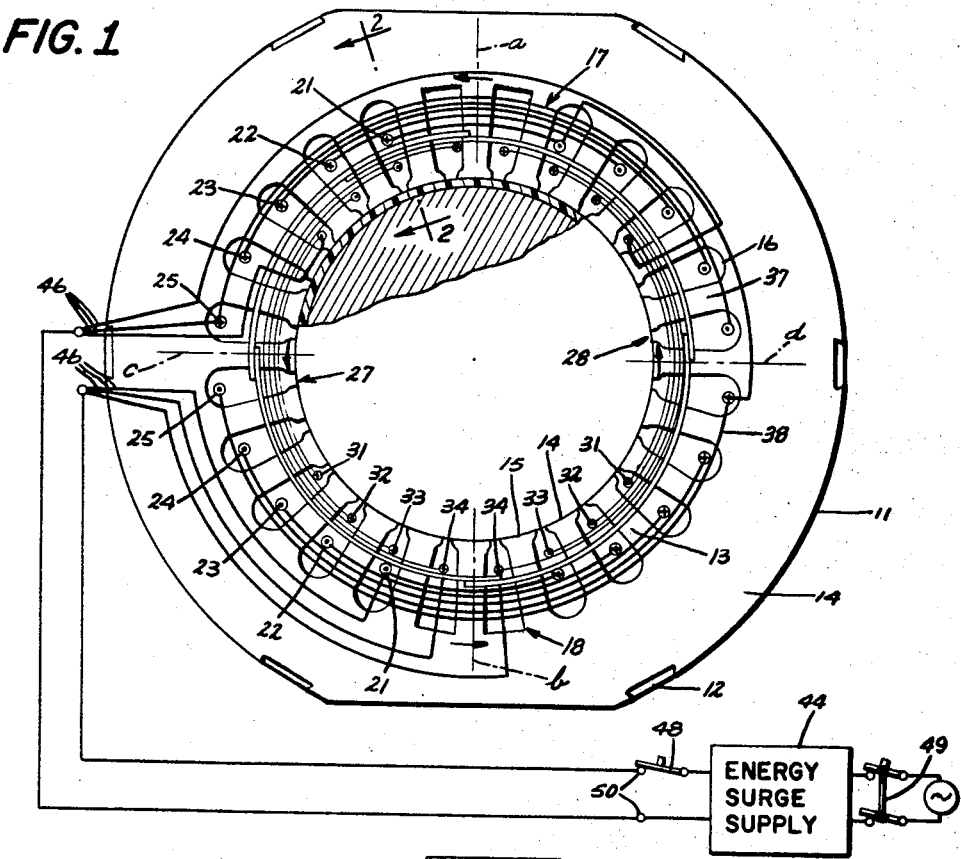
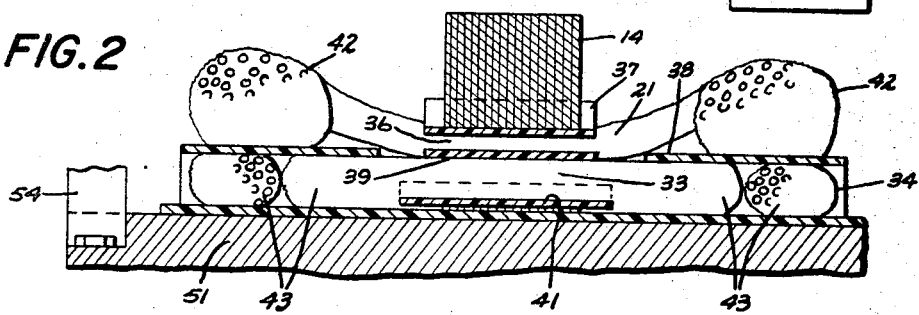
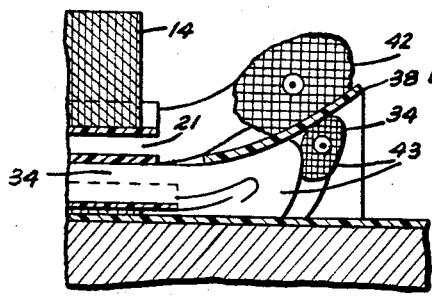
INVENTORS
WILLARD C. HOPKINS
ALVIN L. REDIGER
BY *John M. Stoudt*
ATTORNEY Oct. 29, 1968 W. C. HOPKINS ET AL 3,407,481
METHOD OF PRESSING BACK ELECTRICAL COIL END
TURN PORTIONS IN AN INDUCTIVE DEVICE
Filed July 28, 1966 2 Sheets-Sheet 2

INVENTORS.
Willard C. Hopkins
Alvin L. Rediger
BY
John M. Stoudt
Attorney

United States Patent Office 3,407,481
Patented Oct. 29, 1968

3,407,481
METHOD OF PRESSING BACK ELECTRICAL COIL END TURN PORTIONS IN AN INDUCTIVE DEVICE
Willard C. Hopkins, Holland, and Alvin L. Rediger, Zeeland, Mich., assignors to General Electric Company, a corporation of New York
Filed July 28, 1966, Ser. No. 568,590
6 Claims. (Cl. 29—596)

This invention relates to a method of pressing back electrical turn portions in an inductive device and, in particular, to an improved method of pressing back electrical coil end turn portions of overlapping coils extending beyond the end faces of a core.

In the construction of certain inductive devices such as, for example, dynamoelectric machine stators, a number of coils have end turn portions, which extend beyond the core end faces, carried in overlapping relation. With specific reference to stators having a number of overlapping coil groups displaced in phase, such as a single-phase induction electric motor including main and auxiliary windings, and in particular, to two-pole stators, there is a large end turn mass or volume which must be pressed back away from the bore of the core to keep the innermost end turns out of the bore so that they do not interfere with the proper rotation of the rotatable member, and to decrease the axial over-all length of the device. Recent innovations now permit the press-back operation to be performed by the utilization of electrical energy rather than by the conventional mechanical press units. The disclosures in pending United States patent applications Ser. Nos. 414,822; 414,824; 414,825; 414,826; all filed on Nov. 30, 1964, now Patent Nos. 3,333,327; 3,333,335; 3,333,330; and 3,333,328; Ser. No. 513,028 filed Dec. 10, 1965, and all assigned to the assignee of the present application are typical of these innovations.

It is highly desirable, especially where the coil side portions are already in the slots of the core and may already have been compacted to some degree by existing winding equipment, to provide a method which utilizes electrical energy to press back the end turn portions of over-lapping coils concurrently so that the end turns will be forced electrically into the desired final position in as little time as possible. It is further desirable that this be achieved by an economical and efficient method capable of mass production use in the manufacture of inductive devices without necessitating substantial changes in existing equipment.

It is therefore a primary object of the present invention to provide an improved method of pressing back overlapping electrical coil turns in an inductive device and, more specifically, to provide an improved method especially suitable for concurrently pressing back overlapping end turn portions of a number of coils carried by a magnetic core, such as a stator core.

It is a further object of the present invention to provide an improved method of efficiently pressing back end turn portions of overlapping coil groups displaced in phase carried by a stator core which is economical and rapid to practice and provides at least some of the desirable features mentioned above.

In carrying out the objects of the present invention in one form, we provide an improved method of simultaneously pressing back radially and angularly overlapping electrical coil portions of a number of coils in inductive devices, especially effective in the manufacture of dynamoelectric machine stator members. In one form of the invention, the stator has slots radially outward from a bore which accommodate side portions of a number of coil groups such that adjacent coil groups of different phases have overlapping end turn portions. The coil groups in one exemplification are each formed by a plurality of concentrically arranged coils, with at least one side portion of the outermost coils in each group received in slots occupied or shared by no other coils.

Initially the overlapping end turn portions of the respective phased coil groups are disposed in positions toward the bore which, for example, might occur as a result of a winding insertion operation. These end turn portions are concurrently pressed back away from the bore to other positions by generating at least one surge of electrical energy at approximately the same time in the coil groups to establish interactions and electromagnetic forces which effect the desired press back.

During the press back, the coil side portions which are in non-shared slots tend to compact into a smaller space away from the bore and it is believed that this movement augments the pressing back action of the associated end turn portions. This type of press-back is particularly effective where the side portions, which do not share slots, belong to the outermost coils which include unusually long end turn portions.

Thus, it will be seen that the present invention may be utilized with existing winding equipment to achieve rapid and economically effective press-back of end turn portions even though different phase groups of coils may be involved having overlapping end turn portions. Moreover, the present invention is especially suitable for use in the manufacture of inductive devices where the coil side turn portions have already been compacted to some degree in the winding operation, for instance, cores having slot space factors in excess of 50 percent.

The subject matter which we regard as our invention is particularly pointed out and distinctly claimed in the concluding portion of this specification. Our invention, itself, however, both as to its organization and method of operation, together with further objects and advantages thereof may be best understood by reference to the following description taken in connection with the accompanying drawings.

In the drawings:

FIGURE 1 is an end view, partially in schematic form, of a stator incorporating main and auxiliary windings having radially overlapped coil groups displaced in phase from one another on the core to provide two-pole operation, with one form of the method of the present invention being practiced upon the stator windings;

FIGURE 2 is a view taken along line 2—2 in FIGURE 1 to show a representative relationship of the overlapping end turn portions of two adjacent coil groups and core before the coil groups have been pressed back away from the bore of the core;

FIGURE 3 shows the right hand side of the windings of FIGURE 2 after the end turn portions have been pressed back to the desired second position;

Figure 4:
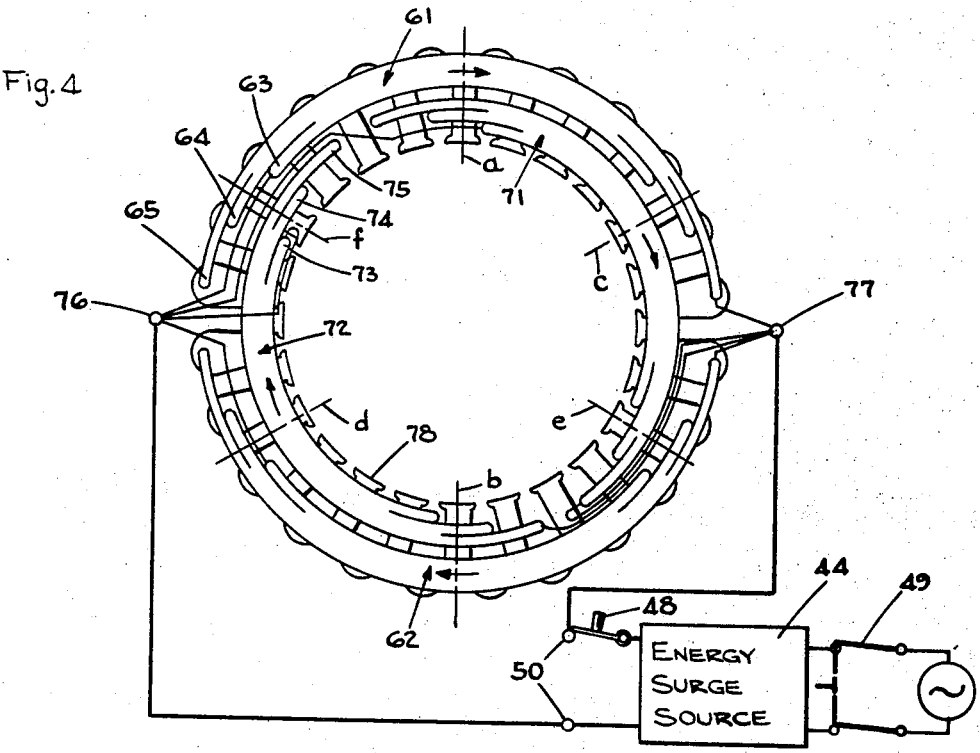
Figure 5:
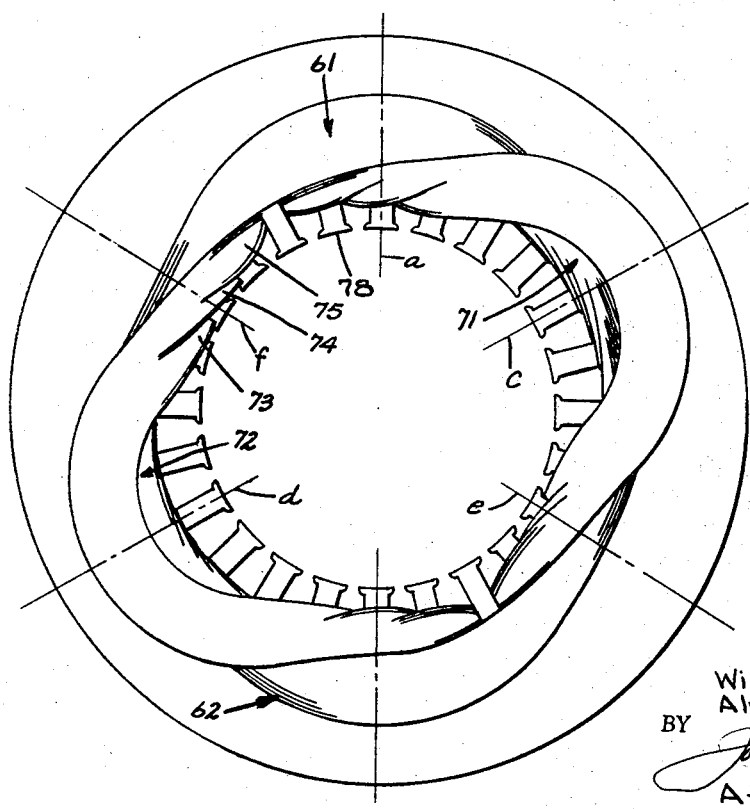

FIGURE 4 is a schematic presentation of one form of the present invention as applied to the manufacture of a two-pole multi-phase winding arrangement carried in the slots of the dynamoelectric machine stator; and FIGURE 5 is a partial end view of the stator of FIGURE 4 depicting the overlapping end turns of the phased coil groups after they have been pressed back into the desired position relative to the core to show the amount of space inwardly of the coil groups available for receiving additional coil groups.

Referring now more particularly to the drawings and, in particular, to FIGURES 1-3, inclusive, one form of the present invention is shown in the manufacture of a stator 11 in general use today in connection with two-pole, single-phase electric motors. The stator of the exemplification is fabricated with a laminated core formed of a number of stacked or aligned magnetic laminations which are punched into the illustrated configuration from suitable relatively thin magnetic sheet material. The laminations are secured together in face-to-face relation by standard key and slot constructions 12 extending axially across the outer periphery of the stack. A plurality of angularly and equally spaced apart teeth sections 13 project radially inward from a yoke 14 and terminate in enlarged lip portions which together define a rotor receiving bore 15. Since the core of the exemplification is adapted for two-pole operation, it is formed with the widely accepted twenty-four slotted construction having open-ended coil accommodated slots 16 provided between adjacent tooth sections 13 in the usual way.

The two phase windings of the exemplification are both of the distributed wound type. In particular, the slots accommodate side portions of a main field winding which is defined by two coil groups 17, 18 having their radial polar centers $a$, $b$, respectively, displaced 180 electrical degrees apart. Each coil group includes five concentric, serially connected, coils 21, 22, 23, 24, 25 wound with a number of predetermined insulated wire conductor turns, such as aluminum or copper, spanning three, five, seven, nine and eleven tooth sections, respectively.

With respect to the second phase winding, an auxiliary winding, it has two coil groups 27, 28 with radial polar centers $c$ and $d$ displaced in phase from coil groups 17, 18 by ninety electrical degrees. Coil groups 27 and 28 are formed by four concentrically and serially arranged coils 31, 32, 33, 34 which respectively span five, seven, nine and eleven teeth sections. Thus, the side portions of the outermost and next to outermost coils 24, and 25 in each coil group of the main winding, which have unusually long mean effective lengths, occupy slots shared by no other coil sides. In a like fashion, outermost coil 34 in coil groups 27, 28 of the auxiliary winding does not share slots with other coils.

The windings may be placed into the slots in any convenient manner, preferably by equipment which installs the coil side portions into the slots with some degree of compaction to provide slot space factors over 50 percent, such as by the machine disclosed in the L. M. Mason Patent No. 2,934,099. The two windings are electrically insulated in the slots from the core by suitable insulation, such as conventional U-shaped slot liners 37 (FIGURE 2) fabricated from polyethylene terephthalate sheet material having the usual cuffed ends extending beyond each end face of the core. The coil end turn overlap portions which project axially beyond the end faces and angularly one another in a radial direction between phases, are insulated from each other by four end turn phase insulators 38 while a common U-shaped between-phase insulator 39 electrically separates the pairs of coil end turn portions for coils 21, 33; 22, 32; and 23, 31 which share the same slots. Slot wedges 41 (FIGURE 2) are conventionally empolyed to close the slot entrances at the bore.

Turning now specifically to FIGURE 2, it depicts a part of the stator seen in FIGURE 1 at the stage in its fabrication before the method of the present invention has been carried out and is representative of the relative positions of the overlapping end turn portions of the phased coil groups with respect to the core. It will be noted from FIGURE 2 that there is a general tendency for the end turn portions, and especially the radially inner turns of the outermost coils in each coil group, to be urged toward the bore and axis of the core, generally away from the core end faces. Numeral 42 refers to the unformed bundle of end turns of the coils in coil group 17 while the end turn portions for overlapped coil group are identified by numeral 43. In spite of the fact that many of the slots carry two side portions of different winding phases and that the end turn portions for the different phases overlap one another in both radial and angular directions, we are able to concurrently and rapidly press back the end turn portions radially away from the bore and axially toward the end faces of the core in a satisfactory manner. In addition, we can attain compaction of the side coil portions toward the bottom of the slots away from the bore for at least the outermost coils in the exemplification which normally contain the most number of turns in a given coil group in an attempt to approximate a sinusoidal ampere-turn pattern.

In carrying out one form of the present invention in connection with the stator of the exemplification, at least one surge of current is generated in all of the overlapping coil groups of the windings, from a suitable pulse supplying circuit or energy surge source 44, which is of sufficient magnitude to effect the desired press back, yet is below the intensity that will deleteriously affect the insulation covering the coil turns. The surge of current flows concurrently through the end turn portions and produces electromagnetic forces which act on the individual end turn portions to transfer the portions from the positions relative to the core shown in FIGURE 2 to that shown in FIGURE 3, where the end turns are radially and axially closer to the associated core end faces. The forces also act on the individual bundles of end turns to compact them into a tight mass. Preferably, the current flow through all of the end turns is in the same direction, as shown by the arrows in FIGURE 1 and by the standard current flow symbols employed in FIGURE 3. For purposes of discussion, it is assumed that the current flow through the winding end turns is counterclockwise in FIGURE 1. The symbol $\oplus$ evidences the direction of current flow through the coils in a given flow downwardly into the drawing while symbol $\odot$ is used to show current flow through the coil turns in an upwardly direction toward the viewer.

During the transformation of the coils from that revealed in FIGURE 2 to that shown by FIGURE 3, it has been observed in actual practice that coil side portions which do not share a slot with other coils tend to be transferred toward the bottom of the slot, away from the bore or the axis of the core. In the exemplification, these side portions are of the outermost coils 25 and 24 for groups 17 and 18 and of outermost coils 34 for coil groups 27, 28. Although the transient flux and current patterns are quite complex in the individual coil groups in view of their overlapped relation, the action for the side portions of the coils just referred to as the current surges therethrough appears to assist in the press back of the end turn portions. For example, in FIGURE 3 it will be seen that the individual turns in the end turn portion for outermost coil 34 are axially away from the core and radially beneath the end turn portions 42. During the rapid movement of the end turn portions, coil 34 helps force end turn portions 42 away from the bore.

Whatever the cause or the reason, the individual turns in the slots for coils 24, 25 and 34 become compact in the slot toward the yoke section, away from the bore, and the end turns for all of the coils are forced rapidly and concurrently to the desired position shown in FIGURE 3. Further, press back is not required under the circumstances. It will be observed from FIGURE 1 that the current flow through side portions 21, 33; 22, 32; and 23, 31 is reversed in a given slot and there does not seem to be the same type of compaction and movement for these side turn portions as for those of coil sides which do not share slots.

In achieving the press back, any suitable surge supply may be utilized, such as that illustrated and described in detail in the aforementioned patent applications. By way of illustration, the individual windings are connected together at terminations 46, 47 which, in turn, are in circuit with source 44 through source actuating switch 48 and terminals 50. Closing of switch 48 actuates a pulsing circuit for charging of capacitor bank in supply 44 to a predetermined voltage level which is regulated by a variable control transformer (not shown). Thereafter, the capacitor bank is discharged and a surge of electrical energy, as controlled by the voltage level on the capacitor bank, is applied directly to the coils across output terminals 50. This surge produces current flow through the individual coil turns to effect transformation of the overlapping coils in the way already discussed. For most applications known to us, and using the surge source under consideration having a capacitor bank rated at 630 microfarads, a maximum voltage charge level of no more than 4,000 volts is needed, and usually between 400 and 500 amperes are discharged from the bank in a time interval ranging from 4 to 6 milliseconds as the current surges through the coils. For intensifying these forces, a non-ferrous or non-magnetic, electrically conductive cylinder 51 may be provided in the bore of the core such that it extends for the axial length of the core and the windings. A sleeve of insulation 52 may be disposed between the cylinder and the core for electrically insulating the innermost turns of the coils which are urged toward the core axis from the conductive cylinder as well as for insuring that the inner turns remain in the slots at all times. The cylinder may readily be used to support the core and coils during the coil transformation which, in turn, may be mounted by supporting fixture or clamp 54, shown in part in FIGURE 2.

It should be noted at this time that in the illustrated exemplification of FIGURE 1, the radially outer coil groups 17, 18 are in series with one another, and in parallel with the individual coil groups 27, 28. We have found in actual practice that in order to derive the maximum benefit from our invention where the radially outermost coil groups contain a higher total number of turns per pole than the innermost coil groups, it is desirable to connect the individual coil groups of the radially innermost groups in parallel. This tends to increase the current flow through the individual turns of the radially innermost coil groups and makes them more effective in assisting in the push back of the overlapping coil groups disposed radially outwardly from them. If desired, a retainer die formed of suitable material, such as fiberglass lined with epoxy resin, may be used outwardly of the end turns to control their final position relative to the core.

The following example is given, which is representative of a number of units manufactured by our method, in order to show how the present invention as outlined above has been carried forth in actual practice. The core and windings were similar to that illustrated, with the core having a nominal diameter across the flats of 5.125 inches and a bore of 2.65 inches. The main winding was wound from .0359 inch diameter copper wire having polyvinyl formal type resin coating. The coil groups included the following number of turns, innermost and outermost: 36, 44, 46, 60, 62 to provide a total number of turns per pole of 248. The auxiliary winding was wound of copper wire, having 20, 24, 39, 58 turns for a total number of 141 turns per pole. The diameter of this wire was .026 inch with an enamel coating of a polyvinyl formal type resin.

After the windings were transformed in the manner already described in connection with FIGURES 1–3 inclusive, the well-known high potential test (Hi-Pot) was completed in the coils in accordance with the National Electrical Manufacturers Association standard Mg–1–12.03, dated Nov. 17, 1949. All tests showed that the transformation of the overlapping coils was accomplished quite satisfactorily in all respects.

Consequently, it will be observed from the foregoing that the present invention is quite effective to rapidly press back end turn portions of all of the coils carried on a core in spite of the fact that the end turn portions overlap one another in radially spaced relation and current flow may be in reversed directions in coil sides sharing the same slots. In addition, side turn portions of coils not sharing slots with other coils may be readily compacted and pressed back away from the bore of the core to augment the press back of the end turns as well as permit insertion of additional coil turns, if such were ever desired. These features, among others, are achieved by an economical and efficient method which is capable of mass production utilization in the manufacture of inductive devices without necessitating substantial changes in existing equipment. In this regard, the present method is particularly effective when practiced with equipment which compacts coil sides sharing slots having over 50% slots space factors in general use today.

It will be appreciated from the foregoing that the present invention is not limited to the example given above in connection with the fabrication of two-pole single phase electric motors but may be effectively incorporated in the production of other inductive devices and winding relationships where a number of coils are carried in radially and angularly overlapping relation. In this latter regard. FIGURES 4 and 5 reveal the present invention applied to the fabrication of a stator for use in a polyphase motor. In this exemplification, one winding phase includes two coil groups 61, 62 formed with three coils 63, 64, 65, concentrically arranged around radial core axis $a$, $b$ disposed 180 electrical degrees apart. The 24 slotted core carries the second winding phase coil groups 71, 72 in the slots, with the axis with the radial polar centers $c$, $d$ of these groups being 60 electrical degrees displaced from centers $a$, $b$ to provide angularly and radially overlapping end turns. Coil groups 71, 72 also include three concentrically arranged coils 73, 74, 75. Side portions for the outermost coils in each group occupy slots having no other side portions at this stage of fabrication. Further, one side of the innermost and intermediate coils are also in non-shared slots. The individual coil groups are connected in parallel with one another such that all of the groups have the same instantaneous plurality. Consequently, the current flow will be in the same direction, through the end turns, an assumed current flow being indicated by the arrows in FIGURE 4. The coil groups are connected through wire terminations 76, 77 and through actuating switch 48 to energy surge supply 44. Thus, in a manner already described in detail with regard to FIGURES 1, 2, and 3, when switch 48 is closed and a surge of electrical energy is generated in these coils, the coil end turns will rapidly and effectively be forced back away from the bore 78 to the desired position seen in FIGURE 5 from an initial position where the turns are urged toward the bore as provided from the winding operation. In addition, it has been observed in actual practice that the side turn portions which do not share slots have a tendency to be compacted and forced away from the bore, thus augmenting the press back action of the individual end turns and the electromagnetic forces produced and interaction developed from the current surge.

FIGURE 5 is an accurate presentation of the final position of the end turn portions relative to the core that may easily be achieved with the present invention in connection with the stator under consideration. It will be noted from that figure that there is more than adequate space exposed, both in the slots adapted to receive additional coils and radially inward of the end turn portions of groups 61, 62, 71, 72 for two coil groups of a third winding phase (not shown). The third phase is similar in coil deployment to the phases already installed and has polar centers at $e$, $f$, 60 electrical degrees away from radial centers $a$, $b$, $c$, and $d$. After the coils of the third phase have been installed in the slots, they may be suitably pressed back, as by connecting the coil groups to supply 44 and generating at least one electrical energy surge in the coils to produce the desired electromagnetic force level and effect press back. Consequently, the same general benefits in the fabrication of the stator shown in FIGURES 4 and 5 are present as those already outlined for the first embodiment.

While only certain preferred features of our invention have been shown herein by way of illustration, it will be appreciated that modifications and changes may be made by those skilled in the art without departing from the true scope and spirit of our invention. It is, therefore, to be understood that the appended claims are intended to cover all equivalent variations as fall within the invention.

What we claim as new and desire to secure by Letters Patent of the United States is:

1. A method of pressing back electrical coil end turn portions of first and second coil group pluralities displaced in phase having coil side portions received in open ended slots of a magnetic core formed with a yoke section and a pair of end faces, with the end turn portions of each coil group projecting beyond the end faces and being in overlapping relation with an adjacent coil group of a different phase, the method comprising the steps of: arranging the individual end turn portions of the coil group pluralities respectively in one position relative to the core; and concurrently pressing back the end turn portions of the first and second overlapping phased coil group pluralities to other positions relative to the core by generating at least one surge of electrical energy at approximately the same time in the coil group pluralities thereby establishing interactions to effect press back of the pluralities to the desired other positions.

2. The method of claim 1 in which the coil groups are defined by a number of concentrically disposed coils, with at least the outermost coil in each group having side portions in slots occupied by no other coil side portions, and with at least one of the other coils in the group having a side portion sharing a slot with a side portion of an adjacent coil group of a different phase; and during the concurrent press-back step, compacting the coil side portion of said at least outermost coil in the slot toward the yoke section as a result of the at least one surge of electrical energy generated therein.

3. The method set forth in claim 1 including the step of placing the first and second coil group pluralities at least sixty electrical degrees.

4. The method set forth in claim 1 in which during the step of pressing back the end turn portions to the other position, current flow in adjacent and overlapping end turns portions of the coil group pluralities are produced in the same direction.

5. The method of claim 1 in which the core is a stator having a bore, the first coil group plurality includes a greater number of total conductor turns than the second plurality, with the second coil plurality having at least two groups of coils disposed nearer the bore than the first coil plurality; and as the end turn portions are being pressed back to the other position, the coil groups of the second coil group plurality are individually connected in parallel with the first coil group plurality to produce a high current flow in the end turn portions of the second coil group plurality during the surge for magnifying the interaction of that plurality with the first coil group plurality.

6. A method of pressing back electrical coil end turn portions of first and second electrical coil pluralities having coil side portions received in open ended slots of a slotted structure having a pair of end faces, with the end turn portions of each coil plurality projecting beyond the end faces and being in overlapping relation with one another, the method comprising the steps of: arranging the individual end turn portions of the coil pluralities respectively in one position relative to the structure; and pressing back the end turn portions of the first and second overlapping coil pluralities to other positions relative to the structure by injecting at least one surge of electrical energy at approximately the same time in the coil pluralities thereby establishing interactions between the coil pluralities and effecting press-back thereof to the desired other positions.

References Cited

UNITED STATES PATENTS

| 3,333,327 | 8/1967 | Larsen | 29—596 |
| 3,333,328 | 8/1967 | Rushing | 29—596 |
| 3,333,329 | 8/1967 | Linkous | 29—596 |
| 3,333,330 | 8/1967 | Linkous | 29—596 |
| 3,333,335 | 8/1967 | Sims | 29—596 X |
| 3,348,183 | 10/1967 | Hodges et al. | |
| 3,359,251 | 11/1967 | Linkous | 29—205 |

JOHN F. CAMPBELL, *Primary Examiner.*

J. L. CLINE, *Assistant Examiner.*